United States Patent [19]
Frey

[11] 3,739,889
[45] June 19, 1973

[54] OVERRUNNING CLUTCH

[76] Inventor: Bernhard Frey, Steigstrasse 94, Schaffhausen, Switzerland

[22] Filed: Apr. 21, 1971

[21] Appl. No.: 136,055

[30] Foreign Application Priority Data
Apr. 21, 1970 Switzerland.......................... 5920/70

[52] U.S. Cl. .............................................. 192/45.2
[51] Int. Cl. ........................................... F16d 41/00
[58] Field of Search .................................... 192/45.2

[56] References Cited
UNITED STATES PATENTS

| 2,192,609 | 3/1940 | Karlsen | 192/45.2 X |
| 2,009,107 | 7/1935 | Coffman | 192/45.2 X |
| 380,692 | 4/1888 | Pond et al. | 192/45.2 X |
| 240,536 | 4/1881 | Peartree | 192/45.2 X |
| 300,733 | 6/1884 | Preston | 192/45.2 |
| 1,170,085 | 2/1916 | Maurseth | 192/45.2 |
| 1,946,038 | 2/1934 | Starbuck | 192/45.2 X |
| 2,633,214 | 3/1953 | Cipriano | 192/45.2 X |

FOREIGN PATENTS OR APPLICATIONS

| 898,510 | 7/1944 | France | 192/45.2 |

Primary Examiner—Allan D. Herrmann
Attorney—Chittick, Pfund, Birch, Samuels & Gauthier

[57] ABSTRACT

An overrunning clutch in which the clutching means is in the form of a long lever arm positively supported at one end and having offset transverse extending clutch surfaces at the other end. Rotation of the driving part produces large forces on the offset clutch surfaces against corresponding rotatable surfaces attached to the driven part.

4 Claims, 5 Drawing Figures

INVENTOR

BY BERNHARD FREY

ATTORNEYS

OVERRUNNING CLUTCH

BACKGROUND OF THE INVENTION

The present invention relates to an overrunning clutch. There are two rotating main parts, one the driving shaft and the other the driven shaft. Between the shafts are a number of clutch members which interlock the two shafts together when the driving shaft is turning in one direction with respect to the driven shaft and which unlock the shafts when the driving shaft is turning in the opposite direction with respect to the driven shaft.

Overruning clutches are known in the art which have as their interlocking means ratchets or balls or other wedging elements. Overrunning clutches are also known as freewheeling units in that the driven shaft can rotate faster than the driving shaft with the interlocking means automatically disengaging. The present invention is particularly concerned with the nature of the interlocking or clutching mechanism.

To satisfy operational requirements, the clutch mechanism must be capable of locking in one direction of rotation, and freewheeling in the other direction. In addition, the clutch must easily disengage itself at the beginning of motion in freewheel direction, and must immediately engage itself at the beginning of motion in the driving direction. The known overrunning clutches fullfil these conditions only more or less satisfactorily. In particular, overrunning clutches with surface contact of the parts exhibit the troublesome property of disengaging with difficulty so that freewheeling occurs with a delay. It has therefore become customary to replace surface contact of the clutch parts by line contact of the parts which achieves, to be sure, an easy disengagement at the beginning of motion in the freewheeling direction, and also an immediate engagement at the beginning of motion in the driving direction, but it reduces the permissible loading value at each clutch engagement position. It is therefore necessary to design such overrunning clutch with a large number of engagement positions to be able to transfer large forces.

SUMMARY OF THE INVENTION

The object of the present invention is to create an overrunning clutch which permits the transfer of large forces with relatively few engagement positions. The clutch engagement elements while designed to make surface contact, do not, however, exhibit the previously mentioned drawback of difficult disengagement as compared to clutch elements functioning with line contact.

The invention provides an overrunning clutch of the type mentioned in the introduction, which is characterized in that the clutch elements are arms mounted for limited turning movement or arms resiliently formed and rigidly attached on the driving part and having at their movable ends two clutch surfaces which are adapted to make frictional engagement with two counter-surfaces in the other driven part.

BRIEF DESCRIPTION OF THE DRAWINGS

The invention is shown in the attached drawings in three embodiments.

DESCRIPTION OF THE PREFERRED EMBODIMENTS

Figure 1:
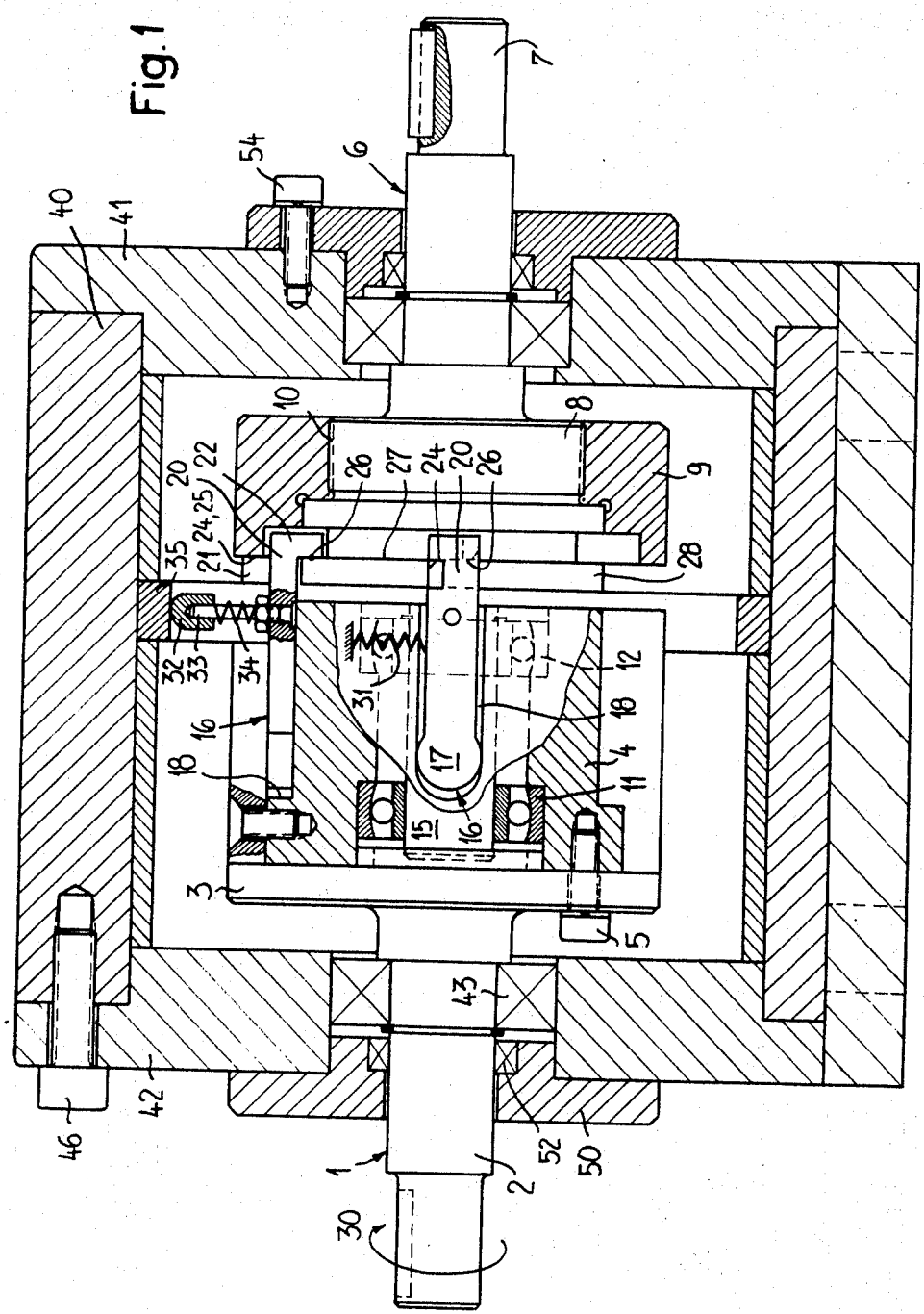
FIG. 1 is an axial section through a schematically drawn first embodiment of an overrunning clutch.

The overrunning clutch according to FIG. 1 consists essentially of two rotating main parts. The one part, denoted generally by 1, consists of a shaft 2 with a flange 3, to which is attached a supporting body 4 by means of bolts 5. The second rotating main part, denoted generally by 6, consists of a shaft 7 to whose flange part 8 is attached a circular body 9 by means of a thread 10. The two main parts 1 and 6 are rotatable with respect to each other on two bearings, for example, roller bearings 11, 12. The outer races of the two roller bearings 11, 12 are supported in the supporting body 4, and the inner races on a shaft journal 15 which is an extension of the main part 6.

The clutch engagement in the one direction of motion, and freewheeling in the other direction of motion between the two main parts 1 and 6 is achieved by the use of clamp arms 16, located in slots in the supporting body 4. Two clamp arms are shown in FIG. 1. However, any arbitrary number of such arms may be arranged about the perimeter of the supporting body 4. Preferably they should be uniformly spaced to minimize vibration. One end 17 of each clamp arm 16 is constructed with an enlarged rounded end which fits closely but not tightly in a notch 18 of the supporting body 4. The remaining narrower part of clamp arm 16 rests in notch 18 whereby limited swinging movement is possible. The other end 20 of each clamp arm 16 has two closely spaced oppositely projecting cams 21, 22 with clamp surfaces 24, 26 which run generally radially of the axis of shafts 2 and 7. Since the arm 16 is long in relation to the spacing of cams 21, 22 and further since the clamp surfaces 24, 26 are in light contact with counter-surfaces 25, 27, a small angular movement of arm 16 will result in the application of a very large force against counter-surfaces 25, 27. The counter-surface 25 is a circular face adjacent the periphery of the circular body 9 which is affixed to shaft 7. The counter-surface 27 is a circular face at the outer edge of a collar 28 which is also affixed to shaft 7. The clamp surfaces 24, 26 and the counter-surfaces 25, 27 lie in a plane which is perpendicular to the common axis of rotation of the two shafts 2 and 7. This plane may also be considered as one species of a conical surface in which the apex angle is 180°.

The clamp surfaces 24, 26 and the counter-surfaces 25, 27 may in principle lie on any conical surface whose total generating or apex angle lies between 0° and 180°. FIG. 1 shows the case with a total generating or apex angle of 180°, i.e., the clamp surfaces are disc shaped, whereas, FIG. 2 which will be described in detail hereinafter, shows an embodiment with a conical surface with a total generating angle of 0°, i.e., the clamp surfaces and the counter-surfaces of FIG. 2 lie on a cylinder whose axis is coaxial with the axes of rotation of the driving and driven shafts. It is also possible to offset axially the clamp surface 24 and its related counter-surface 27, thus forming in effect two parallel conical surfaces of 180° apex angle.

The overrunning clutch described above functions as follows: If the shaft 2 and the attached body 4 rotate in the direction indicated by arrow 30, then each clamp arm 16 is correspondingly carried along by virtue of its position within notch 18. However, since arm 16 is arranged for swinging movement about its enlarged end 17, the other end 20, because of this swinging capability of arm 16 within notch 18, lags a bit behind. This slight change in angular position causes instant heavy pressure of surface 24 against counter surface 25 and of surface 26 against counter-surface 27. These two pressing forces of the surfaces 24 and 26 of cams 21 and 22 in opposite directions against the rigid body 9 and the associated collar 28 create the friction necessary to firmly grip body 9 and collar 28 thereby to put shaft 7 into corresponding rotation. If the shaft 2 turns in the opposite direction to arrow 30 or if shaft 7 is rotated in the direction of arrow 30 at greater speed than that of shaft 2 then the arm 16 will be swung slightly in the opposite direction in notch 18 and the clamp surfaces 24, 26 will be frictionally released from the counter-surfaces 25, 27 and the unit will then function in a manner commonly known as freewheeling.

To achieve an immediate engagement of the clutch at the beginning of motion of shaft 2 in the direction indicated by arrow 30, there has to be provided, as is also common on all known overrunning clutches, a device which induces rapid clutch engagement. For this purpose, two different possibilities are illustrated in FIG. 1. One device shown in plan view represents a schematically drawn spring 31 which is braced with its one end against the supporting body 4, and which presses with its other end on the pivoted clamp arm 16. The same effect is also achieved with an alternative construction shown in sectional elevation in FIG. 1 in which a slide head 32 slidably mounted on the end of a pin 33 is pressed by a spring 34 against a circular fixed slide ring 33. At the beginning of rotation of shaft 2 this brake-like device achieves a slight lag in the movement of the end 20 of the clamp member 16. The use of either the spring 31, or the friction unit 32, 35 holds the clamp surfaces 24, 26 constantly against counter surfaces 25, 27 so that positive clutching will occur whenever shaft 2 rotates in the direction of arrow 30 at a speed in excess of the speed of shaft 7.

The two shafts 2 and 7 are rotatably mounted in a cylindrical housing 40 having end covers 41, 42 carrying shaft bearings 43, 44. The covers 41, 42 are firmly attached to housing 40 by bolts 46. The housing 40 is flattened at one side and on this surface a base plate 47 is attached. The bearings 43, 44 are held in place and protected by covers 50, 51 and packings 52, 53. The covers 50, 51 are fixed to the covers 41, 42 by bolts 54. The housing of the overrunning clutch may be omitted and the clutch installed directly between the rotating parts.

Figures 2, 3:
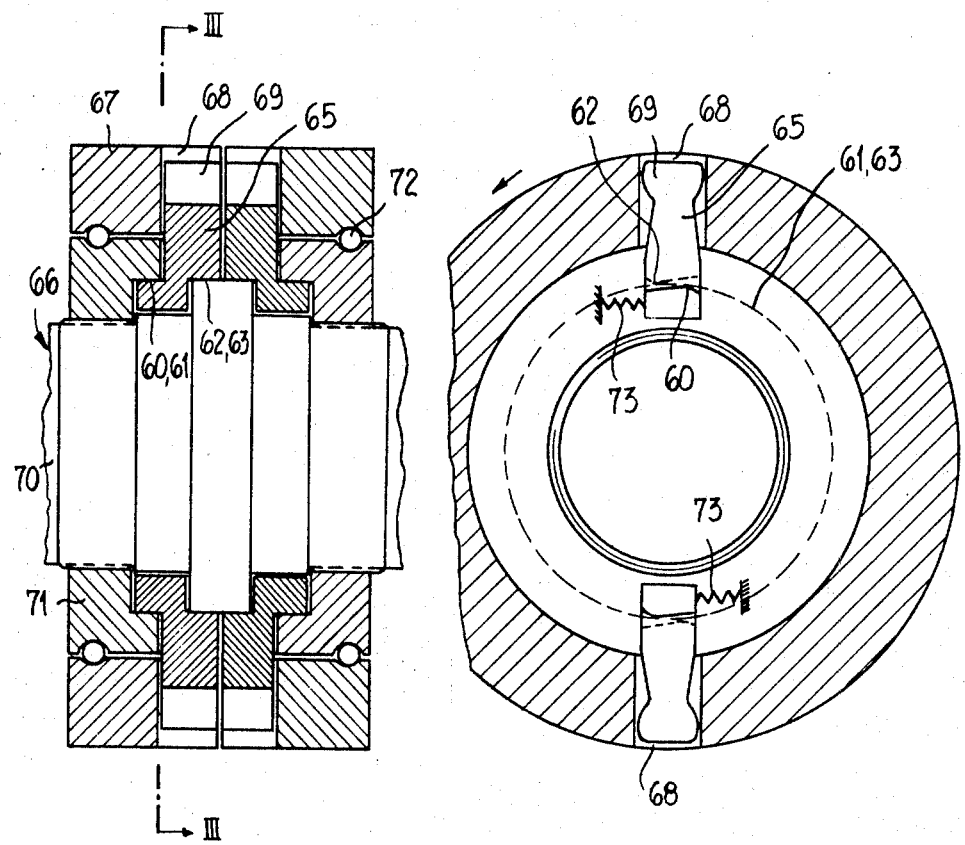
FIG. 2 is an axial section through a schematically drawn second embodiment of an overrunning clutch.
FIG. 3 is a section taken on the line III—III of FIG. 2.

FIGS. 2 and 3 represent schematically another embodiment of an overrunning clutch wherein there are two aligned clamp surfaces 60, 62 associated with each clamp arm 65. The counter-surfaces 61, 63 with which surfaces 60, 62 engage are connected cylindrical surfaces which are coaxial with the axis of rotation of the two main parts 66, 67. One surface 61 faces inwardly and the other surface 63 faces outwardly. In this embodiment of the overrunning clutch the clamp arms 65 are essentially radially arranged. The drive can be undertaken through the main part 67 having radial slots 68 in which the end 69 of each clamp arm 65 is positively supported with the slot sides. The other driven main part 66 consists of a shaft 70 with a circular member 71 bolted on and of which surface 61 is a part. The driving part 67 is rotatable about and guided on the circular member 71 by means of a roller bearings 72.

From FIG. 3 it will be seen that each clamp arm 65 has a spring mechanism 73 which is indicated as braced against the main part 67 and which holds each clamp arm 69 in readiness for immediate engagement of the clamping surfaces 60, 62 against the counter surfaces 61, 63. Of great importance for the described embodiments of the overrunning clutch is that it has the clamping surfaces always positioned for achieving the clutching engagement instantly upon rotation of the driving element. Nevertheless, an easy disengagement at the beginning of opposite relative rotation of the driving and driven elements in the freewheeling direction is assured. Thus there are the joint advantages of having clamping surfaces capable of transferring a heavy load and which may also make as easy disengagement as the line contact type of overrunning clutch. It is also essential that the end of each of the clamp arms away from the clamping surfaces be positively connected with the driving element. Thus in the embodiment of FIG. 1 the clamping arm 16 is pivoted at its left end with respect to the body 4 of drive shaft 2 on the main part 1. In the embodiment of FIGS. 2 and 3 on the clamping arms 65 are pivoted at their widened ends 69 with respect to the driving element 67.

In the embodiment of FIGS. 2 and 3 the clamping arms 65 may be reversed if it is found desirable to use main part 66 as the driving element with element 67 becoming the driven element and rotating in the same direction as the arrow in FIG. 3.

Figure 4:
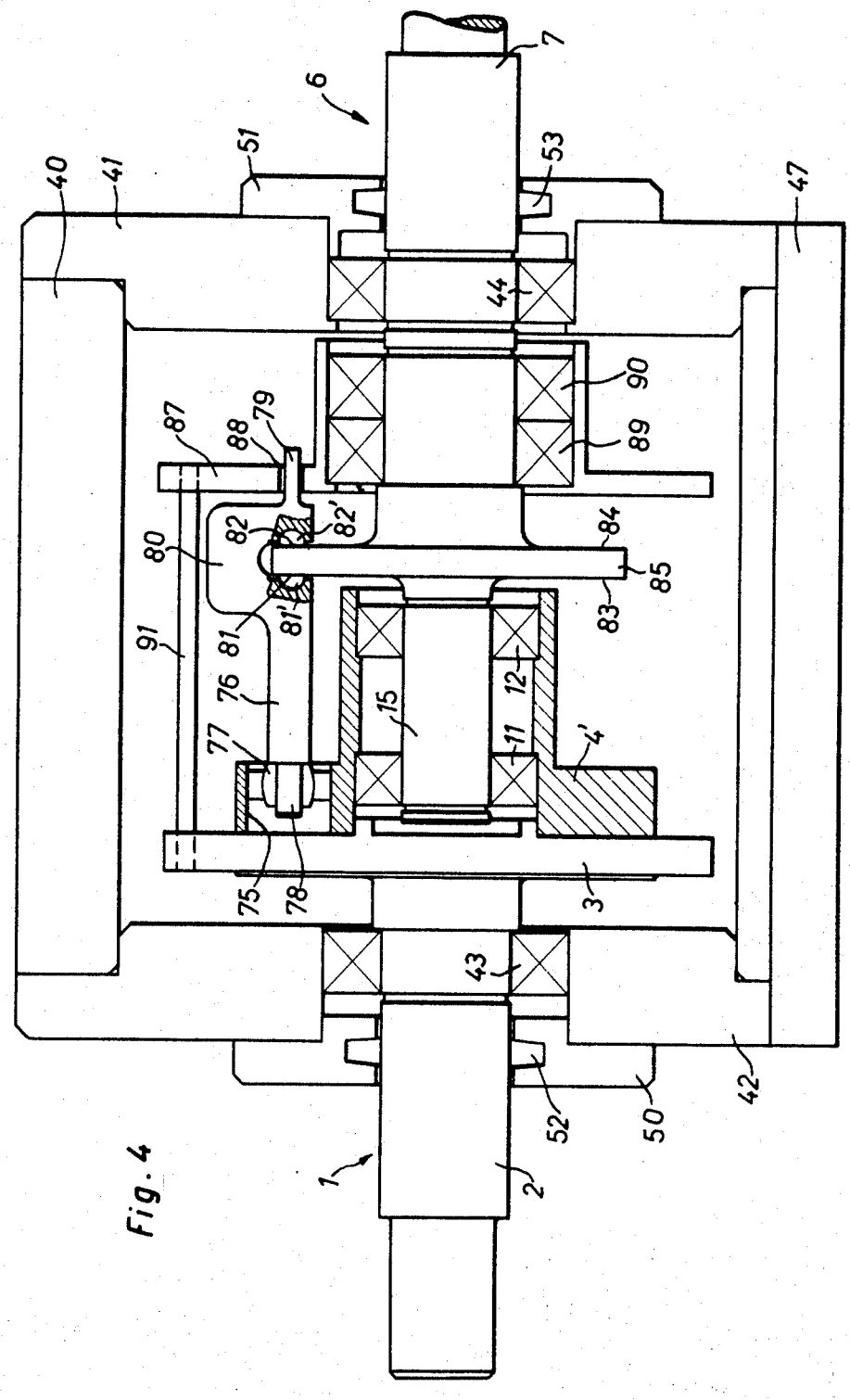
FIG. 4 is an axial section through a schematically drawn third embodiment of an overrunning clutch.
Figure 5:
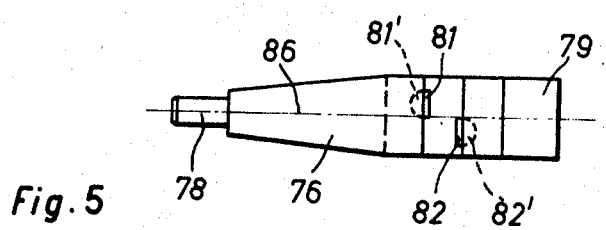
FIG. 5 is a top view of the arm of the overrunning clutch of FIG. 4.

FIGS. 4 and 5 represent an overrunning clutch having some similarity with the embodiment of FIG. 1. However, the design of the clamp surfaces is somewhat different. For ease of recognition identical parts of FIGS. 1 and 4 are denoted by the same numerals.

In FIG. 4, the flange 3 of main part 1 is affixed to a supporting body 4' in the same manner (but not illustrated) as in FIG. 1. This supporting body 4' has a number of boreholes 75 (of which only one is illustrated), and in which the one end 78 of an arm 76 is pivotally supported in a ball and socket joint 77. At its other end, arm 76 has a bracket or U-shaped part 80 on whose inner sides are a pair of clamp surfaces 81, 82 arranged on rotatable hemispherical bodies 81', 82' which interact with two counter-surfaces 83, 84 which are the opposed surfaces of a circular flange 85 which is affixed to the end of shaft 7 of main part 6.

FIG. 5 which is a plan view detail of arm 76 in FIG. 4 shows that the clamp surface elements 81, 82 are on opposite sides of the plane of symmetry 86 of arm 76. The right hand end 79 of arm 76 forms a tongue which is closely engaged by the sides of a slot 88 of a circular cage 87 so that on slight relative angular movement of cage 87 (which is rotatably supported on shaft 7 by means of roller bearings 89, 90) with respect to flange 3 of part 1, the tongue 79 may move tangentially of flange 85 to place the clamp surfaces 81, 82 in engagement with counter-surfaces 83, 84. The cage 87 is held against rotation with respect to flange 3 by a leaf spring 91. Spring 91 acting through the rotatable cage 87 holds the arm 76 in a position ready to cause immediate clutching engagement at the beginning of rotation of shaft 2 in driving direction. Freewheeling in the opposite direction occurs immediately through a corresponding yielding of spring 91 which occurs when shaft 7 begins to rotate faster than shaft 2 is permitted by yielding of spring 91 permitting the release of clamp surfaces 81, 82 from their frictional engagement with counter-surfaces 83, 84.

If desired, the clamp arms may be made of flexible material with one end rigidly attached to the driving part. The other end will be movable the same as in the previously described pivoted forms.

Evidently all embodiments of this invention may be built with drilled out main axes like most of the known constructions of overrunning clutches.

I claim:

1. An overrunning clutch with two rotating main parts, of which one is the driving part and the other the driven part and between which there are arranged a number of clamp members associated with the driving part and which will frictionally grip the driven part in one direction of rotation of the driving part, and release the driven part in the other direction of rotation, said clamp members in the driving part being arms positively supported, one end of said arms forming an entrainment means on the driving part and the other end having a pair of clamp surfaces which acting in opposite directions will make tight frictional engagement with two cooperating counter-surfaces associated with the driven part upon limited rotation of said arms with respect to said driving part, said clamp surfaces lie on the inner sides of a bracket part and embrace the counter-surfaces wherein the remote end of each arm is positively supported in a cage which is arranged for limited rotation with respect to said driving part, whereby each said arm may swing through a limited arc.

2. An overrunning clutch according to claim 1 wherein the cage is rotatable with respect to both driving and driven parts and is connected to the driving part by a spring which holds the clamping surfaces of said arms in slight frictional contact with the said counter-surfaces.

3. An overrunning clutch according to claim 1 wherein said clamp surfaces are arranged to be relatively movable against said bracket part.

4. An overrunning clutch according to claim 3 wherein each clamp surface forms the surface of a support body rotatably arranged on the inner sides of the bracket for aligning with the associated counter-surface.

* * * * *